United States Patent [19]

Ishikawa

[11] Patent Number: 4,457,558

[45] Date of Patent: Jul. 3, 1984

[54] UP AND DOWN MOVING MECHANISM FOR AN AIR SPOILER ASSOCIATED WITH A MOVABLE GRILL

[75] Inventor: Masanobu Ishikawa, Nagoya, Japan

[73] Assignee: Aisin Seiki Kabushiki Kaisha, Kariya, Japan

[21] Appl. No.: 370,336

[22] Filed: Apr. 21, 1982

[30] Foreign Application Priority Data

Apr. 22, 1981 [JP] Japan ............................. 56-58342[U]

[51] Int. Cl.³ ............................................. B62D 35/00
[52] U.S. Cl. .................................. 296/1 S; 180/68.6; 236/35.2
[58] Field of Search ............ 296/1 S; 180/68 R, 68 P, 180/69 R, 54 R; 236/35.2, 35.3

[56] References Cited

U.S. PATENT DOCUMENTS

| | | | |
|---|---|---|---|
| 2,276,279 | 3/1942 | Asklund | 180/68 P |
| 4,131,308 | 12/1978 | Holka | 296/1 S |
| 4,159,140 | 6/1979 | Cabot | 296/1 S |
| 4,249,626 | 2/1981 | Fields | 180/68 R |

*Primary Examiner*—Robert R. Song
*Attorney, Agent, or Firm*—Oblon, Fisher, Spivak, McClelland & Maier

[57] ABSTRACT

An up and down moving mechanism for an air spoiler associated with a movable grill for reducing air resistance is disclosed. The moving mechanism includes a speed sensor detecting the driving speed and transmitting a signal to a control circuit. A thermostat connects to a linkage for controlling the opening and closing of the movable grill in response to the water temperature in a radiator. A motor rotates in response to instructions transmitted from the control circuit and opens a gap between the air spoiler and a bumper. A first circuit detects the position of a thermostat rod and transmits a signal to the control circuit to lift the air spoiler. A second circuit detects a position of a motor rod and transmits a signal to the control circuit to stop a rotation of the motor.

6 Claims, 3 Drawing Figures

UP AND DOWN MOVING MECHANISM FOR AN AIR SPOILER ASSOCIATED WITH A MOVABLE GRILL

BACKGROUND OF THE INVENTION

1. Field of the Invention

This invention relates to up and down moving mechanisms in general and more particularly to an up and down moving mechanism for an air spoiler associated with a movable grill for the purpose of reducing air resistance.

2. Description of the Prior Art

In general it is desirable that the movable grill for a motorcar be shut during driving at high speed, in order to reduce air resistance. Since the water temperature in the radiator rises during the high speed travel of the car however, the thermostat which is connected to the movable grill by means of a linkage opens the shutter of the movable grill in response to the rise in the water temperature. Therefore, the reduction of air resistance cannot be easily attained.

SUMMARY OF THE INVENTION

It is an object of the invention, therefore, to eliminate the disadvantages of prior art up and down moving mechanisms.

More particularly, it is an object of the present invention to provide a new and improved up and down moving mechanism of the air spoiler associated with the movable grill.

In order to attain the above-mentioned objects, there is provided an air spoiler which ascends and descends in response to the speed of the motorcar. Since the air spoiler is lowered so as to open during the high speed of the motorcar, the air flowing under the car body is transmitted to the radiator, thereby cooling the radiator. Therefore, the desired reduction of air resistance can be attained by closing the movable grill by means of the thermostat. In the case of uphill driving and low speed driving, the air spoiler is closed. Since the water temperature of the radiator thus rises, the movable grill is opened by means of the thermostat, thereby preventing the overheating of the radiator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 3:
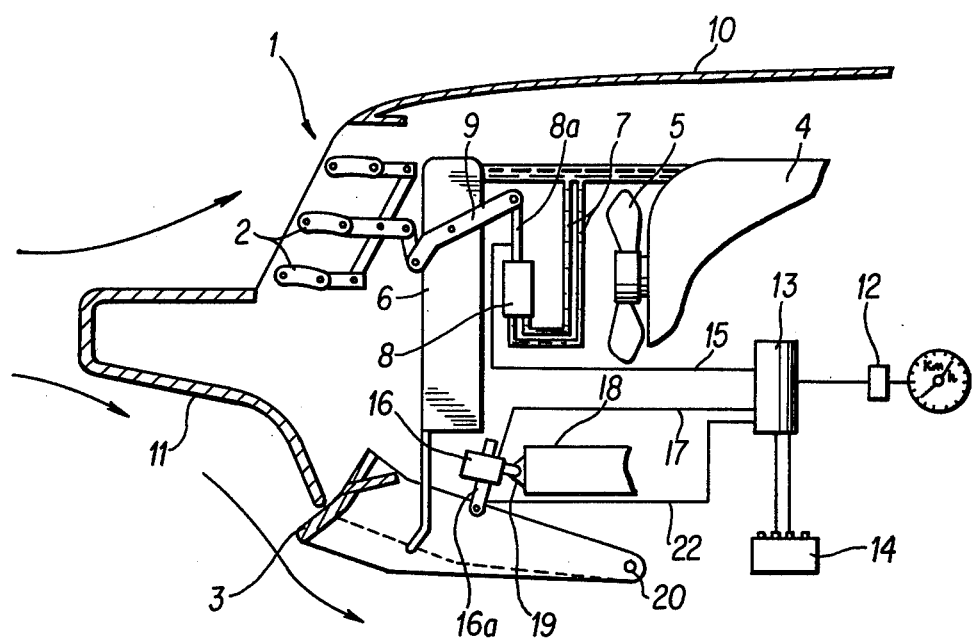
FIG. 3 shows the structure of FIGS. 1 and 2 as the automobile is being driven uphill or at low speed (under 30 km/hr).

Referring now to the drawings, a shutter 2 is installed in a movable grill 1 for reducing air resistance. An air spoiler 3 is associated with the movable grill 1. In front of a cooling fan 5 of an internal combustion engine 4 there is provided a radiator 6 whose cooling water is transmitted to a thermostat 8 by means of pipes 7. Due to heating of the thermostat 8, a rod 8a thereof is elongated. Therefore, as shown in FIG. 3, the shutter 2 of the movable grill 1 is opened by means of the linkage 9. As a result, as shown by the arrows in FIG. 3, air is permitted to be introduced. A hood 10 covers the engine portion of the motorcar and a bumper 11 serves as a buffer.

A speed sensor 12 transmits a speed signal to a control circuit 13 in response to the road speed of the motorcar. A battery 14 provides electrical power to the control circuit 13. The control circuit 13 is in contact with the rod 8a of the thermostat 8 by means of a position detecting circuit 15 detecting the position of the rod 8a. A rotary motor 16, such as an air source, a vacuum source, electric power source, etc., is in contact with the control circuit 13 by means of a circuit 17. The motor 16 is pivotally connected with a body frame member 18. A rod 16a engages with the rotational portion of the motor 16 by means of screw threads. When the motor 16 rotates, the rod 16a moves in and out of the motor. As a result, the air spoiler 3 which is pivotally connected with the lower end of the rod 16a ascends and descends by pivoting about an axis 20. When the air spoiler 3 descends, an opening or a gap 21 is formed between the air spoiler 3 and the bumper 11. When the air spoiler ascends, the gap is closed. Between the motor rod 16a and the control circuit 13 there is provided a position detecting circuit 22 which detects the position of the motor rod 16a.

In operation, when the water temperature of the radiator 6 rises in response to high speed driving, uphill driving, low speed driving, etc. of the motorcar, the rod 8a is elongated by the thermostat 8 and then the shutter 2 of the movable grill 1 is opened by means of the linkage 9.

Figure 1:
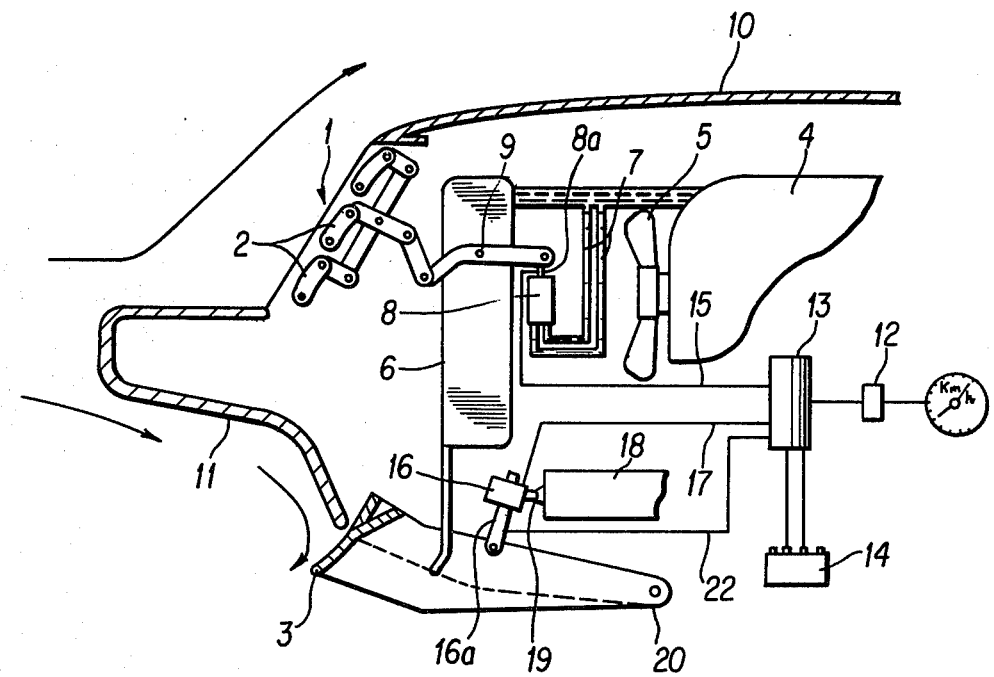
FIG. 1 shows a side sectional view of the up and down moving mechanism of one embodiment of the invention as the automobile is being driven at normal speed (30 to 60 km/hr)

Initially, in the case of normal driving as shown in FIG. 1, the rod 8a is contracted. A signal of this position of the rod 8a is transmitted to the control circuit 13 by means of the position detecting circuit 15. Since the driving speed is below a predetermined value, the motor 16 does not rotate. Accordingly, the air spoiler 3 does not descend, and at the same time the shutter 2 of the movable grill 1 is maintained shut by the linkage 9.

Figure 2:
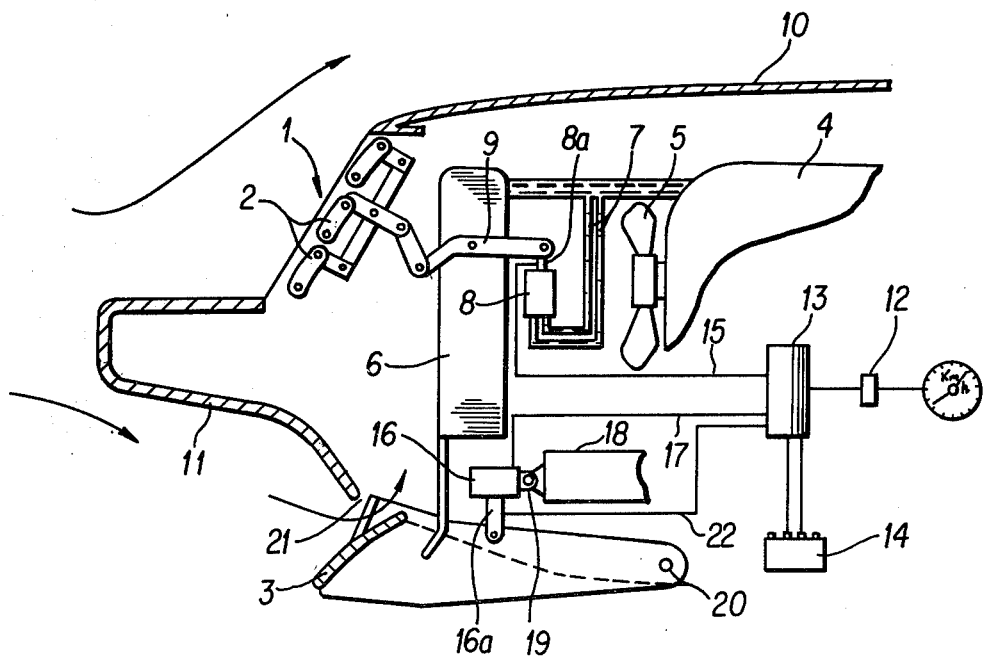
FIG. 2 shows the structure of FIG. 1 as the automobile is being driven at high speed (over 60 km/hr)

In the case of high speed driving, the rod 8a is elongated by means of the thermostat 8 in response to a rise of the water temperature in the radiator 6. At the same time, since the driving speed rises above the predetermined value, an instruction is sent from the control circuit 13 to the motor 16 due to a signal which is transmitted from the speed sensor 12, and the motor 16 is caused to rotate. Accordingly, the air spoiler 3 descends by the elongation of the rod 16a, thereby opening the gap 21 between the air spoiler 3 and the bumper 11. At this time, the position detecting circuit 22 detects the condition of the elongation of the rod 16a and transmits a signal corresponding to the position of the rod 16a to the control circuit 13, thereby stopping the motor 16. The air under the bumper 11 is thus permitted to flow in through the gap 21 as shown by the arrows in FIG. 2. Since the air strikes the radiator 6, the water temperature thereof falls, thereby contracting the rod 8a of the thermostat 8, causing the movable grill to close. The position detecting circuit 15 detects the condition of the contraction of the rod 8a and transmits a signal corresponding to the position of the rod 8a to the control circuit 13. The motor 16 is reversed by the signal which is transmitted from the control circuit 13, thereby lifting the air spoiler 3 and closing the gap 21. As a result, the air does not flow into the gap 21. Next, when the water temperature of the radiator 6 rises again and the rod of the thermostat 8 is elongated, the motor 16 rotates as previously described and the above-described operation is repeated.

In the case of uphill driving, low speed driving, etc., when the water temperature of the radiator 6 rises, the rod 8a of the thermostat 8 is elongated, thereby opening the shutter 2 of the movable grill 1 by means of the linkage 9. Since the driving speed is below the predetermined value, however, the motor 16 does not rotate. As a result, the rod 16a remains contracted, the air spoiler 3 remains lifted, and the gap 21 remains closed. But, since the movable grill 1 is opened, the overheating of the radiator 6 is prevented. Furthermore, even though the movable grill 1 is opened, the resistance of the air is relatively unimportant because the motorcar is not driven at high speed.

As previously described, in the present invention, even though the rod of the thermostat is elongated and the movable grill is opened because of a rise of the water temperature in the radiator during high speed driving of the motorcar, the motor 16 also rotates and the air spoiler descends. Therefore, the air flows into the engine compartment from the gap between the air spoiler and the bumper, thereby lowering the water temperature in the radiator and causing the movable grill to close by means of the thermostat. Accordingly, it is possible to reduce air resistance during high speed driving of the motorcar and to improve driving stability thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a motor vehicle including a front bumper, a movable air spoiler positioned below said bumper, a movable grill and an engine including a radiator positioned behind said grill, an apparatus for moving said air spoiler between a first position in which a gap is formed between said air spoiler and said bumper and a second position in which said gap is closed, said apparatus comprising:

first detecting means for detecting the road speed of said vehicle;

a thermostat including movable output means connected to said grill for opening and closing said grill, said thermostat being actuated in response to the temperature of the water in said radiator;

means for moving said air spoiler between said first and second postions;

second detecting means for detecting the position of said thermostat output means;

third detecting means for detecting the position of said means for moving said air spoiler; and control circuit means receiving signals from said first, second and third detecting means and supplying signals to said means for moving said air spoiler.

2. The apparatus of claim 1 wherein said output means of said thermostat comprises a rod movable into and out of said thermostat and a linkage connected between said rod and said grill, and wherein said thermostat is adapted to close said grill when said water temperature is below a predetermined value and to open said grill when said water temperature is above said predetermined value.

3. The apparatus of claim 1 wherein said air spoiler is pivoted to said vehicle at an end opposite said gap.

4. The apparatus of claim 1 wherein said means for moving said air spoiler comprises a rotary member and a screw shaft connected between said rotary motor and said air spoiler, and wherein said control circuit provides a signal to said rotary motor for moving said air spoiler when said first and second detecting means provide signals to said control circuit.

5. The apparatus of claim 4 wherein said screw shaft is pivotally connected to said air spoiler.

6. The apparatus of claims 4 or 5 wherein said rotary motor is positioned such that said air spoiler moves to said first position as said screw shaft is extended from said rotary motor.

* * * * *